United States Patent [15] 3,688,907
Oravec [45] Sept. 5, 1972

[54] AUTOMATICALLY SELF-CLEANING SELF-AERATING TROPICAL FISHAQUARIUM

[72] Inventor: August J. Oravec, 15496 Gilchrist, Detroit, Mich. 48227

[22] Filed: Dec. 11, 1970

[21] Appl. No.: 97,177

Related U.S. Application Data

[63] Continuation-in-part of Ser. No. 794,616, Jan. 28, 1969, abandoned.

[52] U.S. Cl. ................................................. 210/169
[51] Int. Cl. ............................................. E04h 3/20
[58] Field of Search ............................. 210/167, 169

[56] References Cited

UNITED STATES PATENTS

| | | |
|---|---|---|
| 2,672,845 | 3/1954 | Schneithorst .......... 210/169 X |
| 3,302,789 | 2/1967 | Holt ....................... 210/169 X |
| 1,505,756 | 8/1924 | Wagner ................. 210/169 X |
| 3,261,471 | 7/1966 | Halperp ..................... 210/169 |
| 3,045,829 | 7/1962 | Ryle et al. .................. 210/169 |
| 3,261,371 | 7/1966 | Vernon ................. 210/169 X |

*Primary Examiner*—Reuben Friedman
*Assistant Examiner*—T. A. Granger
*Attorney*—Barthel & Bugbee

[57] ABSTRACT

A contaminated-water intake or suction fitting is mounted near the bottom of the aquarium tank adjacent one end thereof and connected by a pump intake pipe to the suction port of a water pump. The discharge port of the pump is connected by a pump discharge pipe to the top of a multi-media pressure filter containing superimposed layers of filtering materials which filter the contaminated water from the aquarium tank. From a chamber at the bottom of the filter, a filter-water discharge pipe returns the filter water to a water discharge nozzle located adjacent the opposite end of the aquarium tank at the bottom thereof in aligned spaced relationship to the suction fitting. The current of water thus forced along the bottom of the aquarium toward the suction fitting sweeps sediment and other impurities along with it to the suction fitting whence the pump delivers the thus-contaminated water back to the pressure filter. Meanwhile, the current of water flows upward from adjacent the suction fitting in an orbital path along the surface of the water in the tank, thence back toward the water discharge nozzle, thereby aerating the water.

1 Claim, 4 Drawing Figures

Patented Sept. 5, 1972
3,688,907
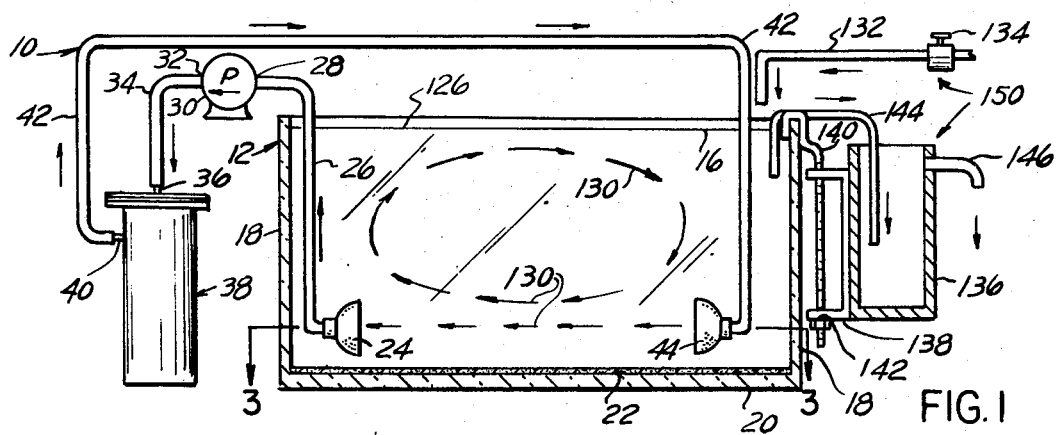
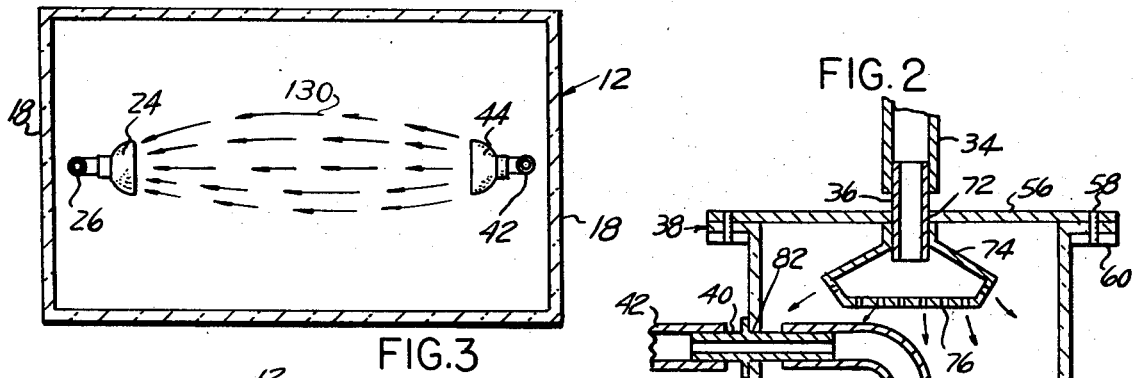
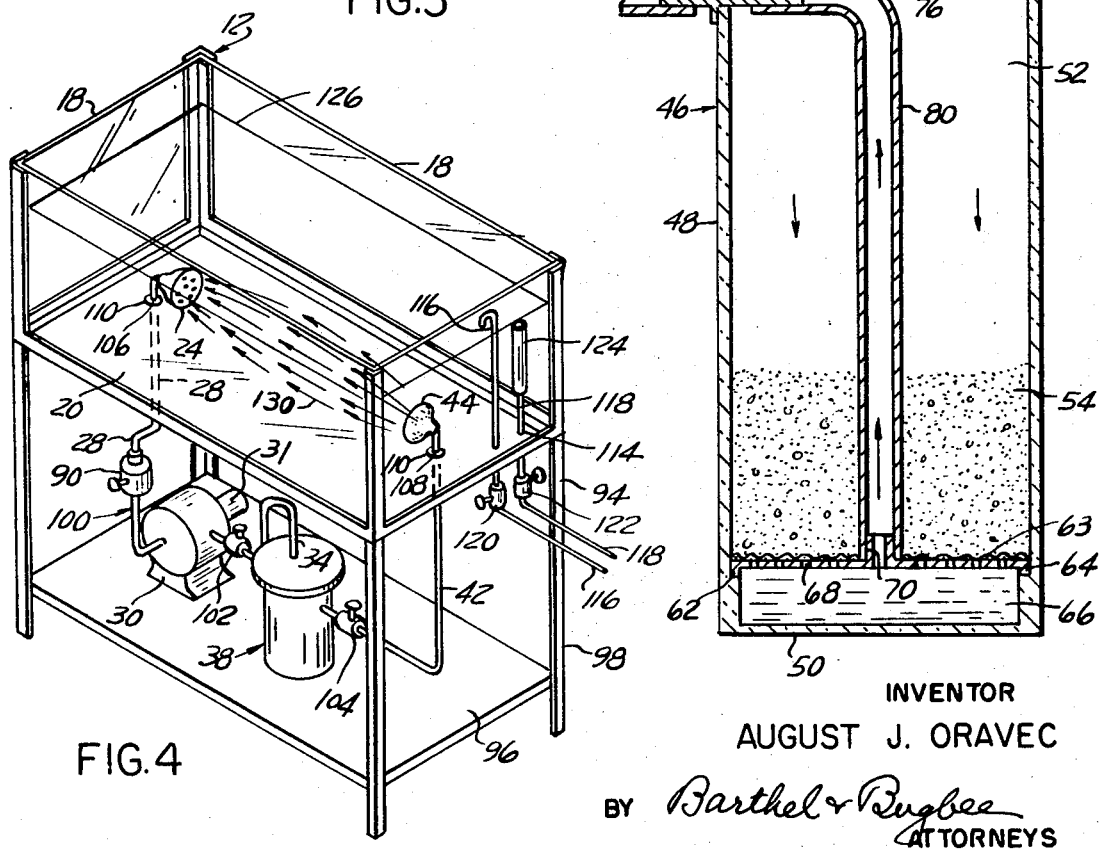
INVENTOR
AUGUST J. ORAVEC
BY Barthel & Bugbee
ATTORNEYS

AUTOMATICALLY SELF-CLEANING SELF-AERATING TROPICAL FISH AQUARIUM

This is a continuation in part of my co-pending application Ser. No. 794,616 filed Jan. 28, 1969 for Water Circulation and Purification System for Aquariums, now abandoned.

The invention (FIG. 1) also provides means including a siphon whereby the water in the aquarium is slowly withdrawn therefrom in order to remove unfilterable liquid wastes, and is replaced by a pipe at an adjustable rate of change regulated by a valve while the water level is automatically maintained at a pre-set level by the siphon.

In the drawings:

FIG. 1 is a side elevation, partly in section, of an automatically self-cleaning self-aerating tropical fish aquarium, according to one form of the invention;

FIG. 2 is an enlarged central vertical section through the multi-media pressure filter used in the system of FIG. 1;

FIG. 3 is a horizontal section taken along the line 3—3 in FIG. 1; and

FIG. 4 is a top perspective view of a modified automatically self-cleaning self-aerating aquarium with its water circulation and purification system installed beneath the aquarium tank, as in a factory-built installation.

Referring to the drawings in detail, FIG. 1 shows an automatically self-cleaning self-aerating tropical fish aquarium, generally designated 10, according to one form of the invention as installed from above in an existing aquarium tank 12. The aquarium tank 12 is filled with water 14 to a level 16 near the tops of the side walls 18 and a bottom wall 20 thereof is covered with a layer of gravel 22.

The aquarium 10 includes a multiport contaminated water intake or suction fitting 24 located on or near the bottom wall 20 of the aquarium tank 12 adjacent the gravel layer 22 near one of the side walls 18 and having a water inlet opening (not shown) having the opposite side wall 18. Connected to and rising from the intake fitting 24 is a pump intake pipe 26 connected to the suction or intake port 28 of a hydraulic pump 30 driven by an electric motor 31 (FIG. 3). Connected to the discharge or pressure port 32 of the pump 30 is a pump discharge pipe 34 leading to the intake fitting 36 on top of a multi-media pressure filter, generally designated 38, described in more detail below. Connected to the flanged discharge fitting 40 is a filtered-water discharge pipe 42 which runs above the aquarium tank 12 to the side wall 18 opposite the intake or suction fitting 24 and downward to a multijet discharge nozzle 44 located, like the intake fitting 24, above the bottom wall 20 of the aquarium tank 12 adjacent the gravel layer 22 thereof and having a water outlet opening (not shown) directed toward said intake fitting 24 in aligned spaced relationship therewith.

The multi-media pressure filter 38 (FIG. 2) consists of a wholly or partially transparent casing 46 which is conveniently cylindrical, with a flanged side wall 48 and a bottom wall 50. The casing 46 encloses an entrance chamber 52 containing a multi-media filter bed 54 arranged in superimposed layers and is closed by a cap 56 either bolted at 58 through the top flange 52 into a stiffening ring 60 or optionally threaded thereon. The side wall 48 a short distance above the bottom wall 40 is provided with an annular internal shoulder 62 upon which rest a fine-mesh screen or porous membrane 63, to retain the filter bed 54, and a flanged perforated partition 64 defining with the bottom wall 50 a filtered-water collection chamber 66. The partition plate 64 is provided with numerous small holes 68 and an upstanding central tubular coupling portion 70. The cap 56 is provided with a central hole 72 in which the filter inlet fitting 36 is snugly mounted with a pressure-tight connection and carries a hollow approximately frusto-conical spray head 74 provided with multiple spray holes 76.

Slipped over and frictionally gripping the tubular coupling portion 70 is the lower end of a bent resilient plastic filter discharge tube 80, the bent upper end portion of which is similarly slipped over the inner end portion of the discharge fitting 40 which passes through and is secured within a hole 82 in the casing side wall 48.

In the modified automatically self-cleaning self-aerating tropical fish aquarium, generally designated 100, shown in FIG. 3, the aquarium tank 12 is mounted on a supporting frame or stand 94 having a platform 96 secured to the legs 98 near the lower ends thereof. Mounted upon the platform 96 is the major portion of the modified aquarium 100. The aquarium 100 for the most part closely resembles the aquarium 10 and similar parts are designated with the same reference numerals. For convenience of disassembly and isolation of the filter 38 from the remainder of the system 100, shutoff valves 90, 102 and 104 are provided in the pipes 28, 34 and 42 respectively. Moreover, the bottom wall 20 of the aquarium tank 12 is bored at 106 and 108 respectively for the passage of the pipes 28 and 42 to which the intake fitting 24 and discharge nozzle 44 are respectively connected. The holes 106 and 108 are, of course, sealed by suitable gaskets 110 to prevent leakage of water. For convenience of filling and emptying the aquarium tank 12, the bottom wall 20 is also bored at 112 and 114 respectively for the passage of filling and drain pipes 116 and 118 respectively. The drain pipes 116 and 118 are provided with shutoff valves 120 and 122 respectively. The filling pipe 116 is connected to a source of water supply, whereas the pipe 118 is connected to a suitable drain. The drain pipe 118 is provided with a vertically-adjustable portion 124 for varying the water level 126.

In the operation of either form of the invention, the pump 30 is started in operation by energizing its driving motor 31, whereupon contaminated water containing sediment and other impurities is drawn into the suction or intake fitting 24, up through the pump intake pipe 26 to the pump 30. The pump discharges the contaminated water under pressure through the pump discharge pipe 34 and through the spray head 74 (FIG. 2) into the entrance chamber 52 of the filter casing 46 upon the top of the filter bed 54. The contaminated water is forced downward through the filter bed 54 by the pressure imparted thereto by the pump 30, losing its sediment and other impurities as it passes through the filter bed 54. The filtered water passes through holes 68 in the partition plate 64 into the filtered-water collection chamber 66. From the latter, it passes upward through the bent filter discharge pipe 80 and outward through the fitting 40 and filtered-water discharge pipe 42 to the discharge nozzle 44. The streams of water emerging under pressure from the outlet openings of the discharge nozzle 44 sweep across the top of the gravel layer 22, taking with them the impurities adjacent thereto, delivering them to the inlet opening of the intake fitting 24, completing the cycle. At the same time, it creates currents which circulate the water within the aquarium in an orbital path across the top water level 126, aerating the water. The cycle is repeated indefinitely and continuously during the operation of the aquarium 10 or 100.

As a result of the operation of the aquarium 10 or 100, the aquarium water 14 is freed of impurities such as sediment, excrement and slime from the fish, unconsumed food and other contaminants which sink to the bottom of the aquarium and ultimately foul the water and cloud or otherwise discolor it. These have a deleterious effect on the health of the fish as well as impart an unsightly appearance to the aquarium and its contents.

Consequently, fungi and fish diseases caused by decomposition of contaminants in the water 14 are avoided by the use of the self-cleaning self-aerating tropical fish aquarium 10 or 100, and the arduous and unpleasant task of emptying and cleaning out the aquarium is also avoided or postponed indefinitely. The aquarium 10 or 100 also aerates the water 14 so as to eliminate the need for an air pump and creates beneficial currents throughout the tank, which flow in an orbital path past the top surface water level 126, back to the nozzle 44 as indicated by the arrows 139 against which currents the fish swim. Such currents have been found necessary for maintaining the maximum health and vitality of the fish. By the use of the aquarium 10 or 100 of the present invention, obnoxious odors are also completely eliminated and the bottom of the aquarium is kept constantly clean. The pump 30, when properly adjusted, as regards its speed, does not dislodge the gravel 22 but creates current streams which sweep over the gravel in this manner and with the results described above.

At the start of operation, the water passes freely through the filter bed 54, but as the latter becomes gradually clogged it offers increasing resistance to the water flow, so that the water level within the entrance chamber 52 rises. This indicates to the operator that the filter bed itself requires purification. This is done by disconnecting the filter 38 bodily from the system and reversing the flow therethrough by connecting its side wall fitting 40 to a source of water under pressure, such as a domestic water faucet, and connecting the fitting 36 to a suitable drain.

In order to remove liquid contaminants, such as fish urine and the like, which cannot be filtered out by the filter 38, an automatic water supply and removal device, generally designated 150, is optionally provided as shown at the right-hand end of FIG. 1. The device 150 includes a fresh water supply pipe 132 which empties into the top of the aquarium tank 12 and is connected to a source of fresh water, such as a domestic water line by way of a control valve 134. The control valve 134 is set at such an adjustment as to permit a slow flow of fresh water into the aquarium tank 12. In order to remove the contaminated water at an equal rate, there is provided a vertically-adjustable auxiliary contaminated water tank 136 secured to a pair of U-shaped brackets 138 (only one which is shown in FIG. 1), each of which is bored vertically in alignment for the passage of supporting hooks 140, the shanks of which are threaded to receive adjusting nuts 142 at their lower ends beneath their respective brackets 138, the upper ends being hooked over the upper edge of one of the aquarium side walls 18. A siphon 144, the long arm of which extends downward into the auxiliary tank 136 and a shorter arm into the aquarium tank 12, serves to continually transfer water from the aquarium tank 12 to the auxiliary tank 136. An auxiliary overflow drain pipe 146 leads out of the auxiliary tank 136 near the top thereof to a drain.

In operation, let it be assumed that the water supply valve 134 has been adjusted to admit a trickle of water into the aquarium tank 12, and that the siphon 144 has been filled with water. As a result of the action of atmospheric pressure and the unequal length of the arms of the siphon 144, the latter withdraws water from the aquarium tank 12 and discharges it into the auxiliary tank 136 which, when filled, overflows into the auxiliary drain pipe 146 and thence into the drain. The water supply valve 134 is adjusted so that the influx of fresh water through the pipe 132 equals the outflow of contaminated water through the auxiliary drain pipe 146. In this manner, a constant supply of fresh water is caused to enter the aquarium tank 12 while at the same time an equal quantity of contaminated water is withdrawn therefrom. This obviates the frequent manual changes of water ordinarily necessary even though sediment and other filterable contaminants have been removed by the filter 38. Otherwise, the gradual accumulation of unfilterable liquid contaminants is harmful to the health of the fish.

I claim:
1. An automatically self-cleaning self-aerating tropical fish aquarium, comprising
   an aquarium tank having a bottom wall and spaced opposite side walls,
   a power-driven water pump having a suction port and a discharge port,
   a contaminated water intake fitting installed in the aquarium tank near the bottom wall adjacent one side wall thereof and having an inlet opening hydraulically connected to said suction port,
   a multi-media back-washable water pressure filter having a pressure-tight vertically-disposed casing with a contaminated-water inlet port near the top thereof, a filtered-water chamber at the bottom thereof, a filter bed of superimposed layers of filtering material in the bottom part of said casing above said chamber with a filtering material screen therebetween and a filtered-water outlet port connected to said chamber,
   means for discharging fresh water into said tank,
   means for transferring liquid-contaminated water from said tank to a liquid-contaminated-water disposal means free from communication with said tank,
   and a filtered-water discharge nozzle installed in the aquarium tank near the bottom wall adjacent the opposite side wall thereof from said inlet opening in spaced unobstructed relationship thereto and having an outlet opening facing said inlet opening and hydraulically connected to said filtered-water outlet port whereby the stream of filtered water emitted from said outlet opening sweeps solid contaminant across from the bottom of the aquarium tank into said inlet opening and also moves currents of water upward in an orbital path past the top surface of the water back to said outlet opening, thereby continually aerating the water throughout the tank.

* * * * *